US006607819B2

(12) United States Patent
Wang et al.

(10) Patent No.: US 6,607,819 B2
(45) Date of Patent: Aug. 19, 2003

(54) POLYMER/DISPERSED MODIFIER COMPOSITIONS

(75) Inventors: James H. Wang, Appleton, WI (US); Vasily A. Topolkaraev, Appleton, WI (US); Bridget A. Balogh, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 142 days.

(21) Appl. No.: 09/751,363

(22) Filed: Dec. 28, 2000

(65) Prior Publication Data

US 2002/0127383 A1 Sep. 12, 2002

(51) Int. Cl.$^7$ .................................................. B32B 5/16
(52) U.S. Cl. ..................... 428/323; 428/220; 428/292.1; 428/372; 428/327; 428/332; 428/390
(58) Field of Search ..................... 482/148; 428/292.1, 428/220, 323, 372, 327, 332, 390

(56) References Cited

U.S. PATENT DOCUMENTS

| 3,177,270 A | 4/1965 | Jones et al. |
| 3,323,978 A | 6/1967 | Rasmussen |
| 3,539,666 A | 11/1970 | Schirmer |
| 3,544,655 A | 12/1970 | Booth et al. |

(List continued on next page.)

FOREIGN PATENT DOCUMENTS

| AU | 52355/93 | 3/1994 |
| DE | 1806165 | 5/1969 |
| EP | 0184440 | 6/1986 |
| EP | 0210754 | 2/1987 |

(List continued on next page.)

OTHER PUBLICATIONS

Derwent Publications, EP 0316792 (Cassella AG), May 24, 1989.
Bartczak, Z. Changes in Interface Shape During Crystallization in Two–Component Polymer Systems *Polymer* vol. 27 pp. 544–554 Apr. 27, 1986.
Mortensen, Phase Behavior of Poly(propylene Oxide)–Poly(ethylene oxide)–Poly(propylene oxide) Triblock Copolymer Melt and Aqueous Solutions *Macromolecules,* Jan. 1, 1994.
Song, Z., Melt Grafting of T–Butylaminoethyl Methacrylate Onto Polyethylene, *Polymer,* vol. 33(5) pp. 3266–3, Jan. 1, 1992.

(List continued on next page.)

*Primary Examiner*—Merrick Dixon
(74) *Attorney, Agent, or Firm*—Kilpatrick Stockton LLP

(57) ABSTRACT

Polymer resin/dispersed modifier compositions are provided. The polymer resin/dispersed modifier compositions have improved melt processability and properties and may be used to thermally process films, fibers, and articles having improved properties. In one embodiment, the polymer resin/dispersed modifier compositions are further grafted with one or more monomers, which graft onto the polymer resin and/or the dispersed modifier. In a further embodiment, the polymer resin is a water-soluble or water-dispersible polymer, such as polyethylene oxide; the modifier is a styrene butadiene polymer, a carboxylated acrylonitrile-butadiene-styrene polymer, or a combination thereof; and the grafted monomer is poly(ethylene glycol) ethyl ether methacrylate, poly(ethylene glycol) ethyl ether acrylate, 2-hydroxyethyl methacrylate (HEMA), poly(ethylene glycol) methacrylate (PEG-MA), or a mixture thereof. The grafted PEO/dispersed modifier compositions have improved properties compared to unmodified polyethylene oxide compositions, and modified polyethylene oxide compositions.

23 Claims, 1 Drawing Sheet

U.S. PATENT DOCUMENTS

| | | | |
|---|---|---|---|
| 3,666,737 A | 5/1972 | Lal et al. | |
| 3,676,529 A | 7/1972 | Fall | |
| 3,717,541 A | 2/1973 | Schirmer | |
| 3,734,876 A | 5/1973 | Chu | |
| 3,763,277 A | 10/1973 | Chu et al. | |
| 3,830,888 A | 8/1974 | King | |
| 3,833,708 A | 9/1974 | Miller et al. | |
| 3,843,589 A | 10/1974 | Wartman | |
| 3,862,266 A | 1/1975 | McConnell et al. | |
| 3,868,433 A | 2/1975 | Bartz et al. | |
| 3,891,584 A * | 6/1975 | Ray-Chaudhuri et al. | 260/27 R |
| 3,933,943 A | 1/1976 | Fahrbach et al. | |
| 3,935,141 A | 1/1976 | Potts | |
| 3,953,655 A | 4/1976 | Steinkamp et al. | |
| 3,954,928 A * | 5/1976 | Omori et al. | 264/51 |
| 3,957,605 A | 5/1976 | Assarsson et al. | |
| 3,963,805 A | 6/1976 | Chu | |
| 3,972,961 A | 8/1976 | Hammer et al. | |
| 3,993,551 A | 11/1976 | Assarsson et al. | |
| 3,996,181 A | 12/1976 | Hayashi et al. | |
| 4,018,729 A | 4/1977 | Faucher et al. | |
| 4,021,509 A | 5/1977 | Murayama et al. | |
| 4,029,720 A | 6/1977 | Seiler et al. | |
| 4,080,405 A | 3/1978 | Agouri et al. | |
| 4,200,704 A | 4/1980 | Stanley et al. | |
| 4,206,155 A | 6/1980 | Korber | |
| 4,225,650 A | 9/1980 | van Brederode et al. | |
| 4,229,334 A | 10/1980 | Klabacka et al. | |
| 4,528,334 A | 7/1985 | Knopf et al. | |
| 4,619,988 A | 10/1986 | Leung et al. | |
| 4,705,525 A | 11/1987 | Abel et al. | |
| 4,705,526 A | 11/1987 | Abel et al. | |
| 4,725,492 A | 2/1988 | Yazaki et al. | |
| 4,792,477 A | 12/1988 | Ochiumi | |
| 4,810,612 A | 3/1989 | Ueda et al. | |
| 4,840,851 A * | 6/1989 | Golander et al. | 428/523 |
| 4,868,222 A | 9/1989 | Chau et al. | |
| 4,874,540 A | 10/1989 | Greenwald et al. | |
| 4,883,699 A | 11/1989 | Aniuk et al. | |
| 5,011,892 A | 4/1991 | Engelhardt et al. | |
| 5,041,496 A | 8/1991 | Engelhardt et al. | |
| 5,059,630 A | 10/1991 | Fujita et al. | |
| 5,075,061 A * | 12/1991 | Howell | 264/171 |
| 5,095,619 A | 3/1992 | Davis et al. | |
| 5,173,539 A | 12/1992 | Boocock et al. | |
| 5,209,849 A * | 5/1993 | Hu et al. | 210/490 |
| 5,217,798 A | 6/1993 | Brady et al. | |
| 5,260,371 A | 11/1993 | Chen | |
| 5,300,574 A | 4/1994 | Bacskai | |
| 5,342,861 A | 8/1994 | Raykovitz | |
| 5,346,959 A * | 9/1994 | Goman et al. | 525/187 |
| 5,354,618 A | 10/1994 | Ishigaki et al. | |
| 5,360,419 A | 11/1994 | Chen | |
| 5,360,586 A | 11/1994 | Wyatt et al. | |
| 5,364,907 A | 11/1994 | Rolando et al. | |
| 5,367,003 A | 11/1994 | Petcavich | |
| 5,369,168 A | 11/1994 | Famili et al. | |
| 5,382,703 A | 1/1995 | Nohr et al. | |
| 5,385,974 A | 1/1995 | Ohmae | |
| 5,391,423 A | 2/1995 | Wnuk et al. | |
| 5,395,308 A | 3/1995 | Fox et al. | |
| 5,412,029 A | 5/1995 | Elm et al. | |
| 5,415,905 A | 5/1995 | Middlesworth et al. | |
| 5,417,679 A | 5/1995 | Toms et al. | |
| 5,429,874 A | 7/1995 | VanPutte et al. | |
| 5,444,123 A | 8/1995 | Zeltner et al. | |
| 5,446,100 A | 8/1995 | Durrance et al. | |
| 5,468,259 A | 11/1995 | Sheth et al. | |
| 5,480,928 A | 1/1996 | Stratta | |
| 5,489,470 A | 2/1996 | Noda | |
| 5,489,647 A | 2/1996 | Kussmaul | |
| 5,498,692 A | 3/1996 | Noda | |
| 5,498,785 A | 3/1996 | Wang et al. | |
| 5,509,913 A | 4/1996 | Yeo | |
| 5,532,066 A | 7/1996 | Latiolais et al. | |
| 5,540,663 A | 7/1996 | Kroner et al. | |
| 5,541,259 A | 7/1996 | Doi | |
| 5,549,791 A | 8/1996 | Herron et al. | |
| 5,587,434 A | 12/1996 | McCullough, Jr. et al. | |
| 5,674,578 A | 10/1997 | Giori | |
| 5,700,872 A | 12/1997 | Wang et al. | |
| 5,753,169 A | 5/1998 | Kaito et al. | |
| 5,807,930 A | 9/1998 | Wang et al. | |
| 5,952,433 A | 9/1999 | Wang et al. | |
| 6,063,866 A | 5/2000 | Wang et al. | |
| 6,117,947 A | 9/2000 | Wang et al. | |
| 6,172,177 B1 | 1/2001 | Wang et al. | |
| 6,214,933 B1 | 4/2001 | Wang et al. | |
| 6,225,406 B1 | 5/2001 | Wang et al. | |
| 6,255,386 B1 | 7/2001 | Wang et al. | |

FOREIGN PATENT DOCUMENTS

| | | |
|---|---|---|
| EP | 0461785 | 12/1991 |
| EP | 0473091 | 3/1992 |
| EP | 0488119 | 6/1992 |
| EP | 0507561 | 10/1992 |
| EP | 0515949 | 12/1992 |
| EP | 0612773 | 8/1994 |
| EP | 0640650 | 3/1995 |
| EP | 0705934 | 4/1996 |
| EP | 0725090 | 8/1996 |
| EP | 0 792 916 | 9/1997 |
| GB | 2070046 | 9/1981 |
| GB | 2295553 | 6/1996 |
| JP | 49-126742 | 12/1974 |
| JP | 58-67766 | 4/1983 |
| JP | 60195151 | 10/1985 |
| JP | 61-181859 | 8/1986 |
| JP | 61-272217 | 12/1986 |
| JP | 5-309111 | 11/1993 |
| WO | WO 94/00163 | 1/1994 |
| WO | WO 94/00293 | 1/1994 |
| WO | WO 95/11929 | 5/1995 |
| WO | WO 95/20614 | 8/1995 |
| WO | WO 95/20615 | 8/1995 |
| WO | WO 95/20621 | 8/1995 |
| WO | WO 95/23249 | 8/1995 |
| WO | WO 95/23250 | 8/1995 |
| WO | WO 96/20738 | 7/1996 |
| WO | WO 96/20831 | 7/1996 |
| WO | WO 96/21057 | 7/1996 |
| WO | WO 96/21475 | 7/1996 |

OTHER PUBLICATIONS

Tang, Tao, Compatibilization of Polypropylene/Poly(Ethylene Oxide) Blends and Crystallization Behavior of the Blends, *Journal of Polymer Science: Part B: Polymer,* vol. 32, pp. 1991–1, Jan. 1, 1994.

Standard Test Method for Tensile Properties of Plastics, *American Society for Testing and Material,* pp. 45–56, Dec. 1, 1995.

Derwent Publications Ltd., Database WPI, JP 08 212995 (Mitsubishi Paper Mills Ltd.), Aug. 20, 1996.

Derwent Publications Ltd., Database WPI, JP 01 246411 (Sawashita A), Oct. 2, 1989.

Hu, Guo–Hua, Free Radical Grafting of Chemically Activated Maleic anhydride onto Polypropylene by Reactive Extrusion—abstract only, *Annu. Tech. Conf.—Soc. Plast. Eng.* vol. 3, Jan. 1, 1994.

Callais, Peter, The Maleic Anhydride Grafting of Polypropylene with Organic Peroxides—abstract only, *Compalloy '90,* Jan. 1, 1990.

* cited by examiner

POLYMER/DISPERSED MODIFIER COMPOSITIONS

FIELD OF THE INVENTION

The present invention is directed to polymer resin/dispersed modifier compositions and methods for producing polymer resin/dispersed modifier compositions. Particularly, the present invention is directed to improved polyethylene oxide/dispersed modifier compositions, methods for improving the melt processability of polyethylene oxide/dispersed modifier compositions, and thermoformable articles formed from the polyethylene oxide/dispersed modifier compositions.

BACKGROUND OF THE INVENTION

Disposable personal care products such as pantiliners, diapers, tampons etc. are a great convenience. Such products provide the benefit of one time, sanitary use and are convenient because they are quick and easy to use. However, disposal of such products is a concern due to limited landfill space. Incineration of such products is not desirable because of increasing concerns about air quality and the costs and difficulty associated with separating such products from other disposed, non-incineratable articles. Consequently, there is a need for disposable products which may be quickly and conveniently disposed of without dumping or incineration.

It has been proposed to dispose of such products in municipal and private sewage systems. Ideally, such products would be flushable and degradable in conventional sewage systems. Products suited for disposal in sewage systems and that can be flushed down conventional toilets are termed "flushable". Disposal by flushing provides the additional benefit of providing a simple, convenient and sanitary means of disposal. Personal care products must have sufficient strength under the environmental conditions in which they will be used and be able to withstand the elevated temperature and humidity conditions encountered during use and storage yet still lose integrity upon contact with water in the toilet. Therefore, a water-disintegratable material having mechanical integrity when dry is desirable.

Due to its unique interaction with water and body fluids, polyethylene oxide (hereinafter PEO) has been considered as a component material for water-disintegratable films, fibers, and flushable products as disclosed in U.S. patent applications Ser. Nos. 09/001,831; 09/001,408; 09/001,525; and 09/219,198; and U.S. Pat. No. 6,117,947; all of which are assigned to Kimberly Clark Worldwide, Inc. PEO,

is a commercially available water-soluble polymer that can be produced from the ring opening polymerization of ethylene oxide,

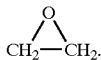

Because of its water-soluble properties, PEO is desirable for flushable applications. However, there is a dilemma in melt processing PEO. Low molecular weight PEO resins have adequate melt properties for limited melt processing, but have limited solid state properties when melt processed into structural articles such as films.

An example of a low molecular weight PEO resin is POLYOX® WSR N-80 PEO, which is commercially available from Union Carbide. POLYOX® WSR N-80 PEO has an approximate molecular weight of 200,000 g/mol as determined by rheological measurements. As used herein, "low molecular weight PEO compositions" are defined as PEO compositions with an approximate molecular weight of less than and including about 300,000 g/mol.

In the personal care product industry, flushable thin-gauged films and melt-spun fibers are desired for commercial viability and ease of disposal. The low melt strength and low melt elasticity of low molecular weight PEO prevent low molecular weight PEO to be drawn into films having a thickness of less than about 1.0 mil. Efforts have been attempted to improve the processability of PEO by blending the PEO with a second polymer, for example, an elastomeric polymer such as ethylene-vinyl acetate copolymer, to produce a water-shrinkable film. See, for example, U.S. Pat. Nos. 5,641,562, assigned to Kimberly-Clark Worldwide, Inc. The PEO/ethylene-vinyl acetate copolymer composition is able to be processed into films of about 1.2 mils in thickness. However, the composition and resulting film are not water-soluble, especially at high levels of ethylene-vinyl acetate copolymer, i.e. about 30 weight percent.

More importantly, thin films made from low molecular weight PEO are too weak and brittle to be useful for personal care applications. Low molecular weight PEO films have low tensile strength, low ductility, and are too brittle for commercial use. Further, films produced from low molecular weight PEOs become brittle during storage at ambient conditions. Such films shatter and are not suited for commercial applications.

High molecular weight PEO resins produce films with improved mechanical properties compared to films produced from low molecular weight PEO resins. An example of a high molecular weight PEO is POLYOX® WSR 12K PEO, which is commercially available from Union Carbide. POLYOX® WSR 12K PEO has a reported approximate molecular weight of 1,000,000 g/mol as determined by rheological measurements. As used herein, "high molecular weight PEOs" are defined as PEOs with an approximate molecular weight of greater than and including about 400,000 g/mol.

However, high molecular weight PEOs have poor processability due to their high melt viscosities and poor melt drawabilities. Melt pressure and melt temperature during melt processing are significantly elevated during melt extrusion of high molecular weight PEOs. During extrusion of high molecular weight PEOs, severe melt fracture is observed. Only very thick sheets can be made from high molecular weight PEOs. High molecular weight PEOs cannot be thermally processed into films of less than about 3–4 mil in thickness. High molecular weight PEOs suffer from severe melt degradation during extrusion and melt processing. This results in breakdown of the PEO molecules and formation of bubbles in the extrudate, as well as, irritating vapors from the degradation of the PEO. The inherent deficiencies of high molecular weight PEOs make it impossible to utilize high molecular weight PEOs in film applications. Even the addition of high levels of plasticizer to the high molecular weight PEOs do not improve the melt processabilities sufficiently to allow the production of thin films without melt fracture and film breakage occurring. In addition, the use of plasticizer in films causes latent problems due to migration of the plasticizer to the film surface. Thus, currently available PEO resins are not practical for melt processing into thin films for personal care applications.

U.S. patent application Ser. No. 09/113,448 discloses a blend comprising PEO and latex which has improved physical properties such as reduced modulus and increased elongation. The blend creates a new physical structure. But the PEO was modified by a chemical reaction and therefore the PEO still retains its own physical properties. However, what is still needed is a chemically modified PEO and modified elastomer structure with improved melt processability in making thin films or fibers and improved physical and mechanical properties.

What is needed in the art is a PEO composition that overcomes the difficulties of melt processing and provides a commercially feasible product for use in flushable, personal care applications.

SUMMARY OF THE INVENTION

The present invention is directed to compositions having improved melt processability and improved mechanical characteristics, such as improved ductility, toughness and tear resistance. The compositions of the present invention comprise a polymer resin component, a dispersed modifier component derived from an emulsion, and a monomer grafted onto one or both of the polymer resin component and the modifier component. In one embodiment, the polymer resin comprises PEO. The present invention is further directed to grafted polymer resin/dispersed modifier compositions having improved processability, and methods for producing the same. Particularly, the present invention is directed to polymer blend compositions made by a melt extrusion process, which contain PEO and a dispersed modifier, which may be further chemically modified by grafting one or more vinyl monomers to the PEO and/or the dispersed modifier during a reactive extrusion process.

The present invention is also directed to films, fibers, and other thermoformable articles made from the melt processable compositions. More particularly, the present invention relates to compositions comprising PEO/modifier compositions and methods of modifying PEO/modifier compositions to improve their melt processability by grafting polar vinyl monomers, such as poly(ethylene glycol) methacrylates of different molecular weights, or 2-hydroxyethyl methacrylate, onto one or both of the PEO and modifier components of the composition. The grafting step is accomplished by melt blending a PEO, a modifier, a polar vinyl monomer(s) and an initiator, and applying heat and intensive shear. In one embodiment, the method of modification is a reactive-extrusion process. PEO compositions modified in accordance with the present invention have improved melt processability and may be thermally processed into films, fibers, and other articles, which have improved physical and mechanical properties over films, fibers, and articles similarly processed from unmodified PEO compositions, and grafted PEO compositions.

These and other features and advantages of the present invention will become apparent after a review of the following detailed description of the disclosed embodiments.

DETAILED DESCRIPTION OF THE INVENTION

Figure 1:
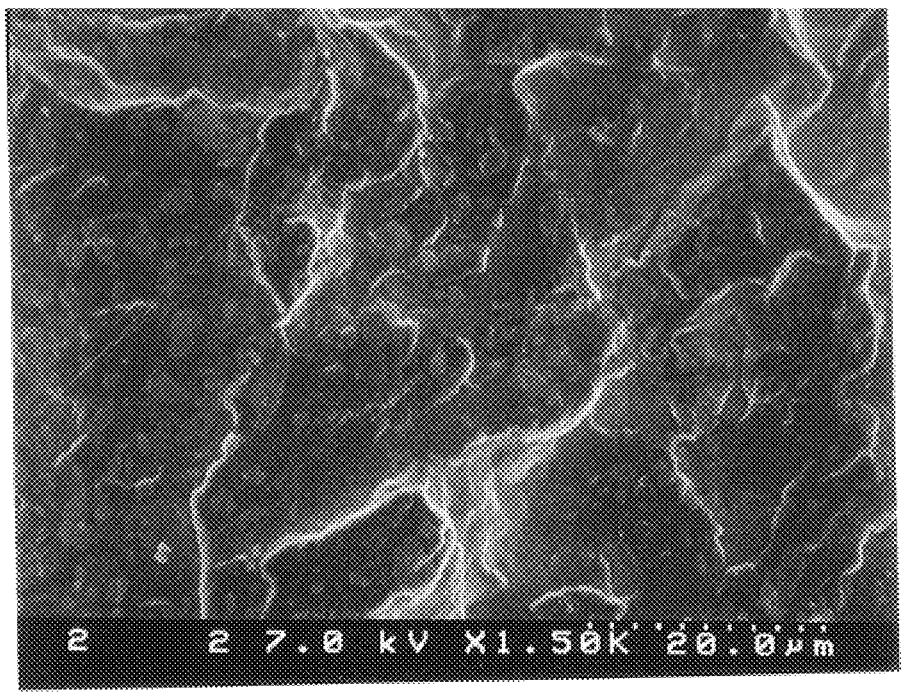
FIG. 1 depicts an image taken with a scanning electron microscope, which shows the phase morphology of a film produced from a 3.6 wt % HEMA grafted PEO/SB 1168 elastomer composition.

The present invention is directed to compositions having improved melt processability and products made therefrom, wherein the products possess improved mechanical characteristics, such as improved ductility, toughness and tear resistance. The melt-processable compositions contain at least one polymer resin and at least one modifier dispersed in the water-soluble polymer resin, and, at least one monomer grafted onto the polymer resin(s) and/or the modifier(s). Desirably, the composition contains PEO as the polymer resin, elastomer as the modifier, and one or more grafted polar monomers. The present invention is further directed to a method of grafting one or more monomers onto one or both of the polymer resin and the modifier during a melt processing step, herein referred to as a "reactive extrusion step" or a "reactive extrusion process." The resulting extrudate is a "grafted polymer resin/modifier composition." As used herein, the term "grafted polymer resin/modifier" or "grafted polymer resin/modifier composition" refers to a composition containing a polymer resin component and a modifier component, wherein one or both components are grafted with one or more monomers. The grafted polymer resin/modifier composition may then be solidified into solid pellets for later thermal processing into useful articles, such as films and fibers, which are in turn useful as components in personal care products. Alternatively, the grafted polymer resin/modifier composition can be directly extruded into films or fibers.

Modification by grafting reactions creates a new chemical structure, i.e. a grafted copolymer with surprisingly improved melt processability and melt strengths not possessed by ungrafted compositions. The new chemical structure is desirable because it can be made into very thin films which are thinner than can be achieved using currently known compositions.

The compositions of the present invention comprise at least one polymer resin. Desirably, the polymer resin is a water-soluble polymer resin. More desirably, the polymer resin is polyethylene oxide (PEO). PEO resins suitable for use in the present invention include, but are not limited to, PEO resins having an average molecular weight ranging from about 300,000 g/mol (supplied by Union Carbide as POLYOX® WSR N-750) to 8,000,000 g/mol (POLYOX® UCARFLOC® Polymer 309), all the molecular weights were approximate molecular weights as determined by rheological measurements, the molecular weights and data was provided by the supplier Union Carbide. This includes all of the PEO resins designated as WSR N-750, WSR N-3000, WSR-3333, WSR-205, WSR-N-12K, WSR-N-60K, WSR-301, WSR Coagulant, WSR-303, as well as, other grades in the above-mentioned molecular weight range, all of which are available from Union Carbide, Danbury, Conn. Both PEO powder and pellets of PEO may be used in the present invention since the physical form of PEO does not significantly affect its behavior during melt processing.

Other polymer resins may be used in place of or in combination with PEO. Examples of such polymer resins include, but are not limited to, hydroxypropyl cellulose, polyvinyl alcohol, polyethyloxazoline, polyvinyl pyrrolidone, polyvinyl pyridine, gelatinized starch, nylon copolymers, polyacrylic acid, poly acrylamide, polyesters, and mixtures thereof.

The amount of polymer resin in the compositions of the present invention may vary depending on the desired properties of the resulting composition. Desirably, the amount of polymer resin in the compositions of the present invention is from about 10 to about 95 weight percent of the composition, based on the total weight of the composition. More desirably, the amount of polymer resin in the compositions of the present invention is from about 45 to about 90 weight percent of the composition, based on the total weight of the composition. Even more desirably, the amount of polymer resin in the compositions of the present invention is from about 50 to about 85 weight percent of the composition, based on the total weight of the composition.

The solid compositions of the present invention further comprise at least one modifier dispersed throughout the polymer resin. As used herein, the term "modifier" is used to describe discrete organic or inorganic particles, which contribute to a change in one or more properties of the polymer resin when dispersed throughout the polymer resin. Suitable modifiers for use in the compositions of the present invention include, but are not limited to, organic polymers, inorganic particulates, emulsions or dispersions containing organic and/or inorganic particles, and combinations thereof. By selecting a particular modifier, one may vary one or more properties of the resulting composition such as softness, ductility, toughness, and tear resistance. Desired modifiers are elastomers or thermoplastic elastomers. Preferred modifiers are elastomers.

Suitable organic elastomeric polymer modifiers for use in the solid compositions of the present invention include, but are not limited to, styrene butadiene polymers, carboxylated styrene butadiene polymers, acrylic polymers, styrene acrylic polymers, polyvinyl acetates, acrylonitrile-butadiene-styrene polymers, acrylonitrile polymers, acrylonitrile-butadiene polymers, carboxylated acrylonitrile-butadiene polymers, and combinations thereof. In one desired embodiment of the present invention, the modifier in the composition of the present invention comprises styrene butadiene polymer, available from B F GOODRICH® Company (Breckville, Ohio) in the form of a latex, GOOD-RITE® 1168, and having a total solids content of 52 wt %. In a further desired embodiment of the present invention, the modifier in the composition of the present invention comprises a carboxylated acrylonitrile-butadiene-styrene polymer, also available from B F GOODRICH® Company in the form of a latex, HYCAR® 1581, and having a total solids content of 46 wt %.

Suitable inorganic modifiers for use in the compositions of the present invention include, but are not limited to, stabilized silica gel dispersions, nanoscale spherical silica dispersions, swellable clay dispersions, and combinations thereof.

The amount of modifier in the composition of the present invention may vary based upon the polymer resin, the particular modifier chosen, and the desired properties of the resulting composition. Desirably, the amount of modifier in the composition of the present invention is from about 5 to about 90 weight percent of the composition, based on the total weight of the composition. More desirably, the amount of modifier in the composition of the present invention is from about 10 to about 55 weight percent of the composition, based on the total weight of the composition. Even more desirably, the amount of modifier in the composition of the present invention is from about 15 to about 50 weight percent of the composition, based on the total weight of the composition.

Two other parameters which affect the properties of the compositions of the present invention are the diameter of the individual modifier particles (particle size) in the composition and the distance between the modifier particles (interparticle distance) within the composition. These two parameters are interdependent. Their relationship may be defined by the following relation:

$$A=D((\pi/6V_p)^{1/3}-1)$$

where A is the interparticle distance of the modifier particles within the composition, D is the average particle size of the modifier particles in the composition, and $V_P$ is the particle volume fraction in the composition, i.e., the concentration of modifier particles. For the present invention, the modifier particles desirably have an average particle size, D, of from about 10 nanometers to about 20 microns, more desirably from about 50 nanometers to about 10 microns, and even more desirably from about 100 nanometers to about 5 microns. Further, the particle volume fraction, $V_p$, in the composition is desirably from about 0.05 to about 0.50, more desirably from about 0.10 to about 0.40, and even more desirably from about 0.15 to about 0.30.

As discussed above, the modifier may be in the form of a dispersion or emulsion when combined with the polymer resin. In this embodiment of the present invention, the water content of the dispersion or emulsion is a factor, which effects processing of the polymer resin/modifier composition, and the properties of resulting extrudate, such as a film. PEO and other water-soluble polymers are capable of forming hydrogen bonded complexes with water. This "bound" water does not exhibit phase transitions. In other words, bound water does not freeze or boil. However, the amount of water which may be bound in such complexes is limited in PEO by the number of ether oxygen atoms in the polymer chain. Additional water will remain in the composition as free water. Free water exhibits phase transitions, meaning it can freeze and boil. These phase transitions can result in microscopic fractures which weaken the composition, resulting in films which are more brittle and possess a lower tensile strength. Consequently, it is desirable in the present invention to minimize the amount of free water in the extruded polymer/modifier solid composition.

Although it is desirable to minimize the amount of free water in the extruded polymer/modifier solid composition, it may be desirable to optimize the amount of "bound" water in the extruded polymer/modifier composition of the present invention. It has been discovered that "bound" water acts as a plasticizer for the polymer/modifier solid composition. In order to obtain desired levels of free and bound water in the extruded polymer/modifier solid compositions of the present invention, the water content of the dispersion or emulsion is desirably less than about 60 wt %, more desirably less than 50 wt %, and even more desirably less than 40 wt %. The resulting extruded polymer/modifier solid compositions of the present invention will desirably have an amount of water, both free and bound water, of less than about 30 wt. %, more desirably less than about 20 wt. %, and even more desirably less than about 15 wt. % of water, with substantially all of the water being bound water.

The compositions of the present invention also contain at least one grafted monomer. A variety of monomers may be used in the compositions of the present invention. As used herein, the term "monomer(s)" includes monomers, oligomers, polymers, mixtures of monomers, oligomers and/or polymers, and any other reactive chemical species, which is capable of covalent bonding with the polymer resin and/or the modifier component. Desirably, the at least one monomer comprises one or more ethylenically unsaturated monomers containing at least one polar functional group, such as a hydroxyl group, a carboxyl group, an amino group, a carbonyl group, a halo group, a thiol group, a sulfonic group, and a sulfonate group. Suitable ethylenically unsaturated monomers include, but are not limited to, acrylates; methacrylates; 2-hydroxyethyl methacrylate (hereinafter HEMA); poly(ethylene glycol) methacrylates (hereinafter PEG-MA) including poly(ethylene glycol) ethyl ether methacrylate, poly(ethylene glycol) acrylates, poly(ethylene glycol) ethyl ether acrylate, poly(ethylene glycol) methacrylates with terminal hydroxyl groups; acrylic acid; maleic anhydride; itaconic acid; sodium acrylate; 3-hydroxypropyl methacrylate; acrylamide; glycidyl methacrylate; 2-bromoethyl acrylate; carboxyethyl acrylate; methacrylic acid; 2-chloroacrylonitrile; 4-chlorophenyl acrylate; 2-cyanoethyl acrylate; glycidyl acrylate; 4-nitrophenyl acrylate; pentabromophenyl acrylate; poly(propylene glycol) methacrylate; poly(propylene glycol) acrylate; 2-propene-1-sulfonic acid and its sodium salt; 2-sulfoethyl methacrylate; 3-sulfopropyl methacrylate; and 3-sulfopropyl acrylate. In one desired embodiment of the present invention, the monomer comprises poly(ethylene glycol) ethyl ether methacrylate or poly(ethylene glycol) ethyl ether acrylate. In a further desired embodiment of the present invention, the monomer comprises 2-hydroxyethyl methacrylate (HEMA). In yet a further desired embodiment of the present invention, the monomer comprises poly(ethylene glycol) methacrylate (PEG-MA).

Desirably, the amount of grafted monomer relative to the amount of polymer resin and modifier may be from about 0.1 to about 40 weight percent of monomer based on the total weight of the polymer resin and the modifier. More desirably, the amount of grafted monomer relative to the amount of polymer resin and modifier may be from about 2 to about 30 weight percent of monomer based on the total weight of the polymer resin and the modifier. Even more desirably, the amount of grafted monomer relative to the amount of the polymer resin and the modifier may be from about 5 to about 25 weight percent of monomer based on the total weight of the polymer resin and the modifier.

The compositions of the present invention may optionally contain various additives including, but not limited to, plasticizers, processing aids, rheology modifiers, antioxidants, UV light stabilizers, pigments, colorants, slip additives, antiblocking agents, and combinations thereof. Typical additives include, but are not limited to, plasticizers, such as TWEEN® 20 plasticizer (ICI Surfactants); antioxidants, such as IRGANOX® 1076, IRGANOX® 5057, and IRGANOX® 1135 (Ciba Specialty Chemicals Holding Inc., Basle, Switzerland), process stabilizers, such as IRGAFOS® 168 (Ciba Specialty Chemicals Holding Inc.); and combinations thereof.

In general, the amount of additives in the solid compositions of the present invention may vary from about 0.1 to about 30 weight percent of the composition. Desirably, the amount of additives in the compositions of the present invention is from about 1 to about 10 weight percent of the composition. More desirably, the amount of additives in the compositions of the present invention is from about 3 to about 6 weight percent of the composition.

In one embodiment of the present invention, the grafted polymer resin/modifier composition comprises PEO, an elastomer modifier, and HEMA as the grafted monomer. In a further embodiment of the present invention, the grafted polymer resin/modifier composition comprises PEO, an elastomer modifier, and acrylic acid as the grafted monomer. In yet a further embodiment of the present invention, the grafted polymer resin/modifier composition comprises PEO, an elastomer modifier, and PEG-MA as the grafted monomer. One desired PEG-MA is a poly(ethylene glycol) ethyl ether methacrylate having a number average molecular weight of approximately 246 grams per mole. PEG-MA having a number average molecular weight higher or lower than 246 g/mol is also suitable for the present invention. Desirably, the number average molecular weight of the PEG-MA is up to about 50,000 g/mol. However, lower molecular weights are desired for faster grafting reaction rates. The desired range of the molecular weight of the PEG-MA is from about 246 to about 5,000 g/mol, more desirably from about 246 to about 2,000 g/mol.

The solid compositions of the present invention may be produced by mixing at least one polymer resin with at least one modifier, and, optionally, grafting at least one monomer onto the components of the mixture during a reactive extrusion process. Although several embodiments and examples of the process are described below, employing PEO as the polymer resin, an elastomer as the modifier, and HEMA as the monomer, the process of the present invention may be carried out in an analogous manner employing any water-soluble or water-dispersible polymer resin, any modifier as defined herein, and any suitable monomer.

The polymer resin may be mixed with the modifier by any means, for example, with a Brabender Plasticorder, a roll mill, or a ribbon blender. Advantageously, the polymer resin, in the form of powder or solid pellets, is mixed with the modifier, in the form of an emulsion, using conventional tumbling techniques or a ribbon blender. A desirable method for mixing the polymer resin powder with the modifier is with a high air pressure spray gun, applying the modifier in the form of an emulsion onto the polymer resin powder, while the polymer resin powder is mixing in a ribbon blender.

A variety of reaction vessels may be useful in the practice of the present invention. The processing of the polymer resin/modifier composition may be performed in any vessel as long as the necessary mixing of polymer resin and modifier, and optional monomer, is achieved and enough thermal energy is provided to effect grafting of the monomer, when present, with the polymer resin and/or the modifier. Such vessels include, but are not limited to, any suitable mixing device, such as Bradender Plasticorders, Haake extruders, single or multiple screw extruders, or any other mechanical mixing device, which may be used to mix, compound, process or fabricate polymers. In one embodiment of the present invention, the reaction device is a counter-rotating, twin-screw extruder, such as a Haake extruder available from Haake, 53 West Century Road, Paramus, N.J. 07652, or a co-rotating, twin-screw extruder, such as a ZSK-30 twin-screw, compounding extruder manufactured by Werner & Pfleiderer Corporation of Ramsey, N.J. It should be noted that a variety of extruders may be used to produce the compositions of the present invention provided that mixing and heating occur.

In one embodiment of the present invention, the reactive extrusion process is carried out in a ZSK-30 extruder. The ZSK-30 extruder allows multiple feeding, has venting ports, and is capable of producing grafted polymer resin/modifier composition at a rate of up to about 50 pounds per hour. If a higher rate of production of modified grafted polymer resin/modifier composition is desired, a commercial-scale twin screw extruder may be used. The ZSK-30 extruder has a pair of co-rotating screws arranged in parallel with the center to center distance between the shafts of the two screws at 26.2 mm. The nominal screw diameters are 30 mm. The actual outer diameters of the screws are 30 mm and the inner screw diameters are 21.3 mm. The thread depth is 4.7 mm. The length of the screws is 1328 mm and the total processing section length is 1338 mm.

The ZSK-30 extruder has 14 processing barrels, which are numbered consecutively 1 to 14 from the feed barrel to the die for the purposes of this disclosure. The first barrel, barrel #1, receives the polymer resin/modifier mixture and is desirably cooled by water. The other thirteen barrels are heated. A monomer, such as HEMA, is desirably injected into barrel #5 and an initiator is desirably injected into barrel #6. Both the monomer and the initiator may be injected via a pressurized nozzle injector, also manufactured by Werner & Pfleiderer. The order in which the polymer resin/modifier mixture, monomer and initiator are added is not critical and the initiator and monomer may be added at the same time or in reverse order. However, the order used in the Examples below is the desired order. The die used to extrude grafted polymer resin/modifier strands has four openings of 3 mm in diameter, which are separated by 7 mm. The grafted polymer resin/modifier strands are extruded onto an air cooled belt and may then be pelletized into cylindrically-shaped solid particles. The extruded grafted polymer resin/modifier melt strands are cooled by air on a fan-cooled conveyor belt approximately 20 feet in length.

In a further embodiment of the present invention, a Haake extruder is used as the reaction device. The Haake extruder is a counter-rotating, twin-screw extruder that contains a pair of custom-made, counter rotating conical screws. The Haake extruder has a length of 300 millimeters. Each conical screw has a diameter of 30 millimeters at the feed port and a diameter of 20 millimeters at the die. The monomer and the initiator are added at the feed throat of the Haake extruder contemporaneously with the polymer resin/modifier mixture.

The Haake extruder comprises six sections as follows: Section 1 comprises a double-flighted forward pumping section having a large screw pitch and high helix angle; Section 2 comprises a double-flighted forward pumping section having a smaller screw pitch than Section 1; Section 3 comprises a double-flighted forward pumping section having a smaller screw pitch than Section 2; Section 4 comprises a double-flighted and notched reverse pumping section where one complete flight is notched; Section 5 comprises a double-flighted and notched forward pumping section containing two complete flights; and Section 6 comprises a double-flighted forward pumping section having a screw pitch intermediate that of Section 1 and Section 2.

A variety of initiators may be useful in the reactive extrusion process of the present invention. When grafting is achieved by the application of heat, as in a reactive-extrusion process, it is desirable that the initiator generates free radicals through the application of heat. Such initiators are generally referred to as thermal initiators. For the initiator to function as a useful source of free radicals for grafting, the initiator is stable at ambient or refrigerated conditions, and generates free radicals at reactive-extrusion temperatures.

Suitable initiators for use in the present invention include, but are not limited to, compounds containing an O—O, S—S, or N=N bond. Compounds containing O—O bonds, peroxides, are commonly used as initiators for polymerization. Such commonly used peroxide initiators include, but are not limited to, alkyl, dialkyl, diaryl and arylalkyl peroxides such as cumyl peroxide, t-butyl peroxide, di-t-butyl peroxide, dicumyl peroxide, cumyl butyl peroxide, 1,1-di-t-butyl peroxy-3,5,5-trimethylcyclohexane, 2,5-dimethyl-2,5-di(t-butylperoxy)hexane, 2,5-dimethyl-2,5-bis(t-butylperoxy)hexyne-3 and bis(a-t-butyl peroxyisopropylbenzene); acyl peroxides such as acetyl peroxides and benzoyl peroxides; hydroperoxides such as cumyl hydroperoxide, t-butyl hydroperoxide, p-methane hydroperoxide, pinane hydroperoxide and cumene hydroperoxide; peresters or peroxyesters such as t-butyl peroxypivalate, t-butyl peroctoate, t-butyl perbenzoate, 2,5-dimethylhexyl-2,5-di(perbenzoate) and t-butyl di(perphthalate); alkylsulfonyl peroxides; dialkyl peroxymonocarbonates; dialkyl peroxydicarbonates; diperoxyketals; ketone peroxides such as cyclohexanone peroxide and methyl ethyl ketone peroxide. Additionally, azo compounds such as 2,2'-azobisisobutyronitrile abbreviated as AIBN, 2,2'-azobis(2,4-dimethylpentanenitrile) and 1,1'-azobis (cyclo-hexanecarbonitrile) may be used as the initiator. The present invention has been demonstrated in the Examples below by the use of a liquid, organic peroxide initiator available from Elf Atochem North America, Inc. of Philadelphia, Pa., and sold under the tradename designation LUPERSOL® 101. LUPERSOL® 101 is a free radical initiator and comprises 2,5-dimethyl-2,5-di(t-butylperoxy) hexane. Other initiators and other grades of LUPERSOL® initiators may also be used, such as LUPERSOL® 130.

The amount of initiator used in the reactive extrusion process may vary depending upon a number of factors including, but not limited to, the mixture components, the monomer, and the reaction temperature. Typically, the amount of initiator feed into the reactive mixture depends on the amount of monomer in the reactive mixture. Desirably, the weight ratio of the amount of initiator to the amount of monomer is less than about 0.2, and more desirably less than about 0.1.

In the reactive extrusion process of the present invention, the temperature of each zone (or section) within the reaction apparatus and the temperature profile from zone to zone (i.e., the three heating zones of the Haake extruder) may vary depending upon a number of factors including, but not limited to, the mixture components, the monomer, the initiator, and the feed rates of the components. Typically, the temperature of each zone (or section) within the reaction apparatus is from about 70° C. to about 220° C. Desirably, the temperature of each zone (or section) within the reaction apparatus is from about 90° C. to about 200° C. More desirably, the temperature of each zone (or section) within the reaction apparatus is from about 100° C. to about 190° C. Further, the temperature profile from zone to zone within the reaction apparatus is typically from a lower temperature of about 70° C. to an upper temperature of about 220° C. Desirably, the temperature profile from zone to zone within the reaction apparatus is from a lower temperature of about 90° C. to an upper temperature of about 220° C. More desirably, the temperature profile from zone to zone within the reaction apparatus is from a lower temperature of about 100° C. to an upper temperature of about 200° C.

The polymer resin/modifier products formed by the extrusion process of the present invention possess improved melt processability properties when compared to extruded products made from the polymer resin alone. Further, the grafted polymer resin/modifier products formed by the reactive extrusion process of the present invention possess even more improved melt processability properties when compared to extruded products made from the polymer resin alone, the polymer resin blended with modifier, and a grafted polymer blended with an ungrafted modifier. As used herein and throughout the present disclosure, the term "grafted" refers to a copolymer produced by the combination of two or more chains of constitutionally or configurationally different components, one of which serves as a backbone main chain, and at least one of which is bonded at some point(s) along the backbone and constitutes a side chain. As used herein, the term "grafting" means the forming of a polymer by the bonding of side chains or species at some point(s) along the backbone of a parent polymer. (See Sperling, L. H., *Intro-* duction to *Physical Polymer Science* 1986 pp. 44–47 which is incorporated by reference herein in its entirety.) In the present invention, it is believed that the improved properties of the resulting extrudate are due to the formation of interconnecting polymer "side" chains, formed by the one or more monomers, which interconnect the polymer "backbone" chains of the polymer resin component to portions of the modifier component, as well as, to other polymer "backbone" chains of the polymer resin component. These side chains have hydrogen bonding and or other polar interactions with each other to enhance properties of the resulting composition. The resulting extrudate may be pelletized and further processed into a variety of thermoformable products.

In addition to improved melt processability properties, the polymer resin/modifier products formed by the extrusion process of the present invention also maintain their degree of water solubility and/or water dispersibility if any. When the polymer resin is a water-soluble or water-dispersible polymer, such as PEO, the resulting polymer resin/modifier extrudate formed by the extrusion process of the present invention maintains the water solubility and/or water dispersibility of the water-soluble or water-dispersible polymer of the composition.

The present invention is further directed to articles made from the above-described compositions. The compositions of the present invention may be fashioned into a variety of products having improved mechanical properties. In one embodiment of the present invention, the process disclosed herein produces a grafted PEO/modifier composition, which may be further processed into useful articles having improved mechanical properties compared to products made from unmodified PEO, grafted PEO, PEO/modifier, or a grafted PEO/ungrafted modifier blend. In this embodiment, it is believed that the monomer, such as HEMA, is grafted to both the PEO and the modifier, such as an elastomer, which results in more interactions between the composition components. These interactions create articles that are tougher, but also softer to the touch.

In one embodiment of the present invention, the polymer resin/modifier solid compositions are formed into films with improved properties. Improved films may be melt processed, using conventional methods, from the polymer resin/modifier compositions produced in accordance with the present invention. Films of the present invention have improved mechanical properties such as ductility, toughness and tear resistance, as well as, desirable physical properties such as a relatively thin film thickness. The desired film thickness may vary depending on the end use of the resulting film and the desired properties of the resulting film. Films made from the polymer resin/modifier composition and having a film thickness greater than about 1.0 mil are within the scope of the present invention. However, in many applications such as flushable articles, it may be desirable to use films having a film thickness of less than 5.0 mil. In one embodiment of the present invention, films made from the polymer resin/modifier composition have a film thickness of less than about 1.0 mil. Desirably, the film thickness is less than about 0.95 mil. More desirably, the film thickness is less than about 0.90 mil. Even more desirably, the film thickness is less than about 0.80 mil.

The films of the present invention exhibit an improved combination of mechanical properties, such as reduced modulus, enhanced flexibility, softness, ductility, elongation-at-break, tensile strength, and tear resistance; and desired levels of breathability. These improvements in tensile behavior are a result of the unique morphology of the blend.

Tensile properties include Young's tensile modulus, tensile stress-at-break, deformation energy-at-break, and elongation (% strain)-at-break. Tensile properties may be measured, for example, with a Sintech tensile tester (SINTECH 1/D) using Testworks 3.03 software (MTS System Co., Cary, N.C.). The films of the present invention were evaluated in both the machine direction (MD) and the transverse direction (TD). The machine direction is the direction along which the film is moved during manufacturing or processing. The transverse direction lies perpendicular to the machine direction and generally along the plane of the film.

Typically, films made from the polymer resin/modifier compositions of the present invention exhibit a decrease in modulus, especially at an elastomer (modifier) loading of 25 weight percent or more. This decreased modulus results in increased flexibility and softness.

Films comprising the polymer resin/modifier compositions of the present invention also exhibit increased elongation-at-break and generally exhibit increased tensile strength when compared to films made from conventional PEO. The increase of these properties contributes to the significant increase in the specific energy required to break the films compared with that required to break films formed from conventional PEO.

In a dry state, films made from the polymer resin/modifier compositions of the present invention may have a tensile strength in the machine direction (MD) of between approximately 3 Mega-Pascal (MPa) and approximately 150 MPa. Desirably, the tensile strength of the film in the machine direction is between approximately 8 MPa and approximately 100 MPa, with improved performance and processibilty during subsequent manufacturing operations achieved at tensile strengths of approximately 50 MPa or less. The dry tensile strength of the film in the transverse direction (TD) is desirably between approximately 3 MPa and approximately 150 MPa, more desirably between approximately 6 MPa and approximately 100 MPa, and even more desirably not greater than 50 MPa.

The percent elongation-at-break of the films of the present invention may be determined using the following formula:

$$100(L_f - L_i)/L_i$$

where $L_f$ is the final length of a film sample at the break and $L_i$ is the initial length of the film sample prior to elongation. The films of the present invention may have an elongation-at-break in the machine direction of between about 30% and about 1500%, desirably between about 80% and about 1000%, more desirably between about 150% and about 1000%. The films may exhibit an elongation-at-break in the transverse direction of between about 30% and about 1500%, desirably between about 50% and about 1000%, and more desirably between about 100% and about 1000%.

Breathability of the films of the present invention may be determined by measuring the water vapor transmission rate (WVTR). The water vapor transmission rate for films may be calculated using the ASTM Standard E96-80 method as described in Example 11. Films comprising the polymer resin/modifier compositions of the present invention also exhibit improved breathability over films made from conventional water-insoluble polymers. Breathability is an important property in personal care products made from films because it allows the product to dry during use, reducing moisture against the skin. Thus, increased breathability of the film reduces skin breakdown, redness, irritation, and infection associated with retained moisture.

Conventional films made from water-insoluble polymers have very low water vapor transmission rates and, thus, decreased breathability. This problem is overcome in the prior art by the addition of fillers followed by stretching of the film to produce pores which provide breathability to the ultimate product. One type of filler which is used in the prior art calcium carbonate. The overall breathability of such products as measured by water vapor transmission rate varies widely from about 500 g/m$^2$/24 hr/mil (grams per square meter, per 24 hours, per 0.001 inch of film thickness) to about 5000 g/m$^2$/24 hr/mil, depending upon the filler employed, the amount of filler employed, and the amount by which the film is stretched. In general, the films of the present invention provide enhanced water vapor transmission rates of from about 300 g/m $^2$/24 hr/mil to about 20,000 g/m$^2$/24 hr/mil, desirably from about 800 g/m$^2$/24 hr/mil to about 7,000 g/m$^2$/24 hr/mil. Most desirably, the films of the present invention exhibit a water vapor transmission rate of from about 1700 g/m$^2$/24 hr/mil to about 2500 g/m$^2$/24 hr/mil without stretching and without the formation of pores.

The superior properties of the films of the present invention make the films well suited for use in disposable, flushable medical and personal care products. Such products include, but are not limited to, drapes, towels, covers, overwraps, gowns, head coverings, face masks, shoe coverings, CSR wraps, sponges, dressings, tapes, underpads, diapers, liners, wash cloths, sheets, pillow covers, napkins, clothlike outercovers, feminine tampons, pads and pantiliners, baffle films, and any woven, nonwoven, or otherwise formed materials. These materials may be employed in the medical industry, both in hospitals and outpatient facilities, and in the home environment.

For the production of such products, the films of the invention can be subjected to a selected plurality of stretching operations, such as uniaxial or biaxial stretching. Stretching operations can provide the film with enhanced softness, improved tactile properties, enhanced breathability, and reduced thickness. The film can also be post-treated to improve film properties by annealing the film at elevated temperatures; by spraying the film with a surface-active fluid to impart water or moisture repellent properties to the film; or by modifying the physical state of the film with ultraviolet radiation, an ultrasonic treatment, or high energy radiation treatment. In addition, the post-treatment of the film may incorporate a selected combination of two or more of the foregoing techniques.

Additionally, the films of the present invention can be coextruded or coated with a thin barrier layer, such as a resin, to provide a water or moisture barrier layer. The barrier layer can constitute about 3 to 20% of the overall gauge of the film. Examples of resins which can be utilized for such barrier layers include, but are not limited to, polycaprolactone, ethylene acrylic acid copolymers, polybutylene succinate, such as BIONOLLE® and KRATON® resins.

For applications in personal care products, the films of the present invention may be embossed or otherwise provided with a matte finish to exhibit a more aesthetically pleasing appearance. The films may also be optionally be laminated with a nonwoven fabric. Examples of suitable fibers for the nonwoven fabric include, but are not limited to, organic fibers, such as cellulosic fibers, and synthetic fibers made from thermoplastic polymers, such as polyester, polyamide, and polypropylene. The nonwoven fabric can be optionally coated or treated to impart a desired level of liquid and/or vapor/moisture impermeability.

The present invention is further directed to fibers drawn from the polymer resin/modifier solid compositions described herein. The polymer resin/modifier compositions are drawn into fibers using conventional methods including, but not limited to, melt spinning processes. Fibers produced in accordance with the present invention have improved properties as discussed above, and are useful in a number of applications, particularly for flushable applications.

The present invention is further directed to a variety of articles as described above, which contain one or more thermoformable components formed from the polymer resin/modifier compositions described above.

In one desired embodiment of the present invention, the films, fibers and articles produced using the polymer resin/modifier compositions of the present invention have improved ductility, toughness and tear resistance during use, but are water-dispersible and/or flushable. It should be noted that films, fibers and articles within the scope of the present invention also include articles containing the polymer resin/modifier compositions of the present invention in combination with one or more conventional polymers. For example, in one embodiment of the present invention, a thermoformable article comprises a continuous phase of a water-soluble or water-dispersible polymer, such as PEO, and a dispersed phase of a polymer resin/modifier composition of the present invention.

The present invention is further illustrated by the following examples, which are not to be construed in any way as imposing limitations upon the scope thereof. On the contrary, it is to be understood that resort may be had to various other embodiments, modifications, and equivalents thereof which, after reading the description herein, may suggest themselves to those skilled in the art without departing from the spirit of the present invention and/or scope of the appended claims.

EXAMPLES

Example 1

Method of Producing a Grafted PEO/Modifier Composition by a Reactive Extrusion Process Using a Haake Extruder A PEO-containing composition was fed to a Haake twin screw extruder (available from Haake, 53 West Century Road, Paramus, N.J., 07652) at 4.0 lb/hr. The PEO-containing composition was 52.5 wt. % PEO (POLYOX® WSR N-750), 25 wt. % SB latex (carboxylated styrene-butadiene latex, available as GOOD-RITE® 1168, containing 52 wt % solids), 22 wt. % plasticizer (TWEEN® 20), and 0.5 wt. % antioxidant (IRGANOX®1076).

The extruder had 4 temperature zones. The temperature of the feed zone was cooled by water, the temperature of the first zone was set at 155° C., the temperature of zones 2 and 3 were both set at 175° C., and the temperature of the die was set at 125° C. In addition to the components mentioned above, HEMA monomer and 2,5-dimethyl-2,5-di(t-butylperoxy) hexane, an initiator supplied by Elf Atochem, 2000 Market St., Philadelphia, Pa. 19103-3222 under the tradename of LUPERSOL® 101, were contemporaneously added at the extruder feed throat. The feed rate of the HEMA monomer was 0.144 lb/hr, and the feed rate of the initiator was 0.013 lb/hr. The screw speed of the extruder was 120 rpm.

The resulting grafted PEO/grafted elastomer composition formed extruded melt strands, which were cooled in air using a fan-cooled conveyor belt. The solidified strands were then pelletized on a Conair pelletizer.

The melt pressure (psi) and torque (m·g) versus time was monitored for the reactive extrusion process of Example 1.

The monomer and initiator were injected into the system beginning at t=48 minutes. Following the addition of the monomer and initiator, an increase and stabilization in melt pressure was observed. Before the grafting reaction commenced, the average melt pressure was below 50 psi; after grafting, the average melt pressure increased to 175 psi and stabilized. The torque values also stabilized following the grafting reaction. Before the monomer and peroxide were added, the torque fluctuated wildly, from as high as 2400 m·g to as low as 170 m·g. However, while grafting was occurring, the torque remained in a narrow range between 1500 and 2000 m·g. (See FIG. 1.)

In addition to the stabilization of the process, the tackiness of the extruded melt strands reduced following the grafting reaction. The melt strands of PEO-containing composition prior to grafting were sticky and difficult to cool. At the end of the air cooling belt, the strands were still too hot to touch and had a tendency to stick to the belt. Once monomer and initiator were injected and reacted with the PEO-containing composition during the reactive extrusion process, the strands became much less tacky. At the end of the cooling belt, the strands were warm, but able to be handled; the grafted PEO-containing composition strands easily released from the cooling belt.

It is believed that the addition of the elastomer to the PEO formulation further reduces the crystallization rate of the slow cooling PEO polymer. When the PEO/elastomer blend is grafted, the molecular weight of the composition is reduced. The reduction in molecular weight allows crystallization of the polymer to occur much more quickly. This results in improved processability. For example, an unmodified PEO composition is extremely difficult to pelletize and/or process into film or other useful articles. However, the grafted PEO/grafted elastomer blend of the present invention is easily pelletized and may be cast into thin films as discussed above.

Example 2

Method of Producing an Ungrafted PEO/Modifier Composition by an Extrusion Process Using a Werner & Pfleiderer Extruder A PEO-containing composition was fed to a 30 millimeter twin-screw extruder manufactured by Werner & Pfleiderer Corp. (Ramsey, N.J.) at 25.0 lb/hr. The PEO-containing composition was 71.0 wt. % PEO (POLYOX® WSR-205, molecular weight: 600,000 g/mol based on rheological measurements per data supplied by Union Carbide), 23.5 wt. % SB latex (available as GOOD-RITE® 1168 from B F Goodrich Company, Brecksville, Ohio), 5.0 wt. % plasticizer (TWEEN® 20), and 0.5 wt. % antioxidant (IRGANOX®1076).

The extruder had a total processing length of 1328 millimeters, fourteen barrel sections, and seven heating zones. Barrel no. 1 was cooled by water. The heating elements for barrels 2, 3, and 4 were grouped as Zone 1; the heating elements for barrels 5 and 6 were coupled as Zone 2; the heating elements for barrels 7 and 8 were coupled as Zone 3; the heating elements for barrels 9 and 10 were coupled as Zone 4; the heating elements for barrels 11 and 12 were coupled as Zone 5; the heating elements for barrels 13 and 14 were coupled as Zone 6; and the die was Zone 7. The temperature of Zone 1 was set at 170° C., and the temperatures of Zones 2–7 were set at 180° C.

The composition was fed into the extruder at the extruder feed throat. The screw speed of the extruder was 300 rpm. No monomer or initiator was added to the system. During the extrusion process, processing conditions were recorded. The melt temperature was 205° C., the melt pressure was 450 psi, and the torque was 51%.

The extruded melt strands were cooled in air using a fan-cooled conveyor belt. The solidified strands were then pelletized on a Conair pelletizer.

Example 3

Method of Producing a Grafted PEO/Latex Composition by a Reactive Extrusion Process Using a Werner & Pfleiderer Extruder A grafted PEO/modifier composition was extruded using the Werner & Pfleiderer extruder as in Example 2. The PEO/latex composition was identical to the composition as used in Example 2, except a polar monomer and an initiator were added during the reactive extrusion process. The polar monomer, HEMA, was added to the molten PEO/latex composition through an injection orifice on barrel 5 at a feed rate of 0.375 lb/hr. The initiator, LUPERSOL® 101, was added to the molten polymer composition through an injection orifice on barrel 6 at a feed rate of 0.038 lb/hr. Both chemicals were injected via pressurized nozzle injectors.

During the reactive extrusion process, processing conditions were recorded. The melt temperature was 206° C., the melt pressure was 315 psi, and the torque was 50%. A decrease in melt pressure was observed as compared to Example 2.

The extruded melt strands were cooled in air using a fan-cooled conveyor belt. The solidified strands were then pelletized on a Conair pelletizer.

Example 4

Method of Producing a Grafted PEO/Modifier Composition by a Reactive Extrusion Process Using a Werner & Pfleiderer Extruder A grafted PEO/latex composition was prepared and extruded as in Example 3, except that the feed rate of the HEMA monomer was 0.75 lb/hr and the feed rate of the LUPERSOL® 101 initiator was 0.075 lb/hr.

During the reactive extrusion process, processing conditions were recorded. The melt temperature was 205° C., the melt pressure was 297 psi, and the torque was 52%.

The extruded melt strands were cooled in air using a fan-cooled conveyor belt. The solidified strands were then pelletized on a Conair pelletizer.

Example 5

Method of Producing a PEO/Modifier Composition by an Extrusion Process Using a Werner & Pfleiderer Extruder A PEO/latex composition was prepared as in Example 2, except that POLYOX® WSR N-750 (molecular weight: 600,000 g/mol based on Theological measurements per data supplied by Union Carbide) was used in place of POLYOX® WSR-205. No monomer or initiator was added to the system.

During the reactive extrusion process, processing conditions were recorded. The melt temperature was 206° C., the melt pressure was 440 psi, and the torque was 42%.

The extruded melt strands were cooled in air using a fan-cooled conveyor belt. The solidified strands were then pelletized on a Conair pelletizer.

Example 6

Method of Producing a Grafted PEO/Modifier Composition by a Reactive Extrusion Process Using a Werner & Pfleiderer Extruder

A grafted PEO/latex composition was extruded using the Werner & Pfleiderer extruder as in Example 5. The PEO/latex composition was identical to the composition as used in Example 5, except a polar monomer and an initiator were added during the reactive extrusion process. The polar monomer, HEMA, was added to the molten PEO/latex composition through an injection orifice on barrel 5 at a feed rate of 0.375 lb/hr. The initiator, LUPERSOL® 101, was added to the molten polymer composition through an injection orifice on barrel 6 at a feed rate of 0.038 lb/hr. Both chemicals were injected via pressurized nozzle injectors.

During the reactive extrusion process, processing conditions were recorded. The melt temperature was 205° C., the melt pressure was 216 psi, and the torque was 46%.

The extruded melt strands were cooled in air using a fan-cooled conveyor belt. The solidified strands were then pelletized on a Conair pelletizer.

Example 7

Method of Producing a Grafted PEO/Modifier Composition by a Reactive Extrusion Process Using a Werner & Pfleiderer Extruder

A grafted PEO/latex composition was extruded as in Example 6, except that the feed rate of the HEMA monomer was 0.75 lb/hr and the feed rate of the LUPERSOL® 101 initiator was 0.075 lb/hr.

During the reactive extrusion process, processing conditions were recorded. The melt temperature was 204° C., the melt pressure was 222 psi, and the torque was 45%.

The extruded melt strands were cooled in air using a fan-cooled conveyor belt. The solidified strands were then pelletized on a Conair pelletizer.

Example 8

Method of Producing a PEO/Modifier Composition by an Extrusion Process Using a Werner & Pfleiderer Extruder

A PEO/latex composition was prepared as in Example 5, except that a process stabilizer, 0.25 wt. % IRGAFOS® 168, and two antioxidants, 0.15 wt. % IRGANOX® 5057 and 0.1 wt. % IRGANOX® 1135 (all of which are available from Ciba Specialty Chemicals Corporation, Tarrytown, N.Y.), were used in place of antioxidant IRGANOX® 1076. No monomer or initiator was added to the system.

During the reactive extrusion process, processing conditions were recorded. The melt temperature was 212° C., the melt pressure was 550 psi, and the torque was 56%.

The extruded melt strands were cooled in air using a fan-cooled conveyor belt. The solidified strands were then pelletized on a Conair pelletizer.

Example 9

Method of Producing a Grafted PEO/Modifier Composition by a Reactive Extrusion Process Using a Werner & Pfleiderer Extruder

A grafted PEO/latex composition was extruded as in Example 8. The PEO/latex composition was identical to the composition as used in Example 8, except a polar monomer and an initiator were added during the reactive extrusion process. The polar monomer, HEMA, was added to the molten PEO/latex composition through an injection orifice on barrel 5 at a feed rate of 0.375 lb/hr. The initiator, LUPERSOL® 101, was added to the molten polymer composition through an injection orifice on barrel 6 at a feed rate of 0.038 lb/hr. Both chemicals were injected via pressurized nozzle injectors.

During the reactive extrusion process, processing conditions were recorded. The melt temperature was 208° C., the melt pressure was 344 psi, and the torque was 51%.

The extruded melt strands were cooled in air using a fan-cooled conveyor belt. The solidified strands were then pelletized on a Conair pelletizer.

Example 10

Method of Producing a Grafted PEO/Modifier Composition by a Reactive Extrusion Process Using a Werner & Pfleiderer Extruder

A grafted PEO/latex composition was extruded as in Example 9, except that the feed rate of the HEMA monomer was 0.75 lb/hr and the feed rate of the LUPERSOL® 101 initiator was 0.075 lb/hr.

During the reactive extrusion process, processing conditions were recorded. The melt temperature was 207° C., the melt pressure was 291 psi, and the torque was 42%.

The extruded melt strands were cooled in air using a fan-cooled conveyor belt. The solidified strands were then pelletized on a Conair pelletizer.

Example 11

Method of Producing a PEO/Modifier Composition by an Extrusion Process Using a Werner & Pfleiderer Extruder

A PEO/latex composition was prepared as in Example 5, except that carboxylated acrylonitrile butadiene latex (HYCAR® 1581, total solids content—46 wt %) was used in place of SB1168. No monomer or initiator was added to the system.

During the reactive extrusion process, processing conditions were recorded. The melt temperature was 21° C., the melt pressure was 730 psi, and the torque was 46%.

The extruded melt strands were cooled in air using a fan-cooled conveyor belt. The solidified strands were then pelletized on a Conair pelletizer.

Example 12

Method of Producing a Grafted PEO/Modifier Composition by a Reactive Extrusion Process Using a Werner & Pfleiderer Extruder

A grafted PEO/latex composition was extruded as in the composition as used in Example 11, except a polar monomer and an initiator were added during the reactive extrusion process. The polar monomer, HEMA, was added to the molten PEO/latex composition through an injection orifice on barrel 5 at a feed rate of 0.375 lb/hr. The initiator, LUPERSOL® 101, was added to the molten polymer composition through an injection orifice on barrel 6 at a feed rate of 0.038 lb/hr. Both chemicals were injected via pressurized nozzle During the reactive extrusion process, processing conditions were recorded. The melt temperature was 212° C., the melt pressure was 467 psi, and the torque was 51%.

The extruded melt strands were cooled in air using a fan-cooled conveyor belt. The solidified strands were then pelletized on a Conair pelletizer.

Example 13

Method of Producing a Grafted PEO/Modifier Composition by a Reactive Extrusion Process Using a Werner & Pfleiderer Extruder A grafted PEO/latex composition was extruded as in Example 12, except that the feed rate of the HEMA monomer was 0.75 lb/hr and the feed rate of the LUPERSOL® 101 initiator was 0.075 lb/hr.

During the reactive extrusion process, processing conditions were recorded. The melt temperature was 204° C., the melt pressure was 242 psi, and the torque was 50%.

The extruded melt strands were cooled in air using a fan-cooled conveyor belt. The solidified strands were then pelletized on a Conair pelletizer.

Examples 2–13

Summary of Compositions and Process Conditions; Preparation of Films from PEO Compositions A summary of the PEO-containing compositions of Examples 2–13 are given below in Table 1.

A summary of the process conditions for Examples 2–13 below in Table 2.

TABLE 2

| | Process Conditions | | | |
|---|---|---|---|---|
| Example | Screw Speed (rpm) | Melt Temperature (° C.) | Melt Pressure (psi) | Torque (%) |
| 2 | 300 | 205 | 450 | 51 |
| 3 | 300 | 206 | 315 | 50 |
| 4 | 300 | 205 | 297 | 52 |
| 5 | 300 | 206 | 440 | 42 |
| 6 | 300 | 205 | 216 | 46 |
| 7 | 300 | 204 | 222 | 45 |
| 8 | 300 | 212 | 550 | 56 |
| 9 | 300 | 208 | 344 | 51 |
| 10 | 300 | 207 | 291 | 42 |
| 11 | 300 | 211 | 730 | 46 |
| 12 | 300 | 212 | 467 | 51 |
| 13 | 300 | 204 | 242 | 50 |

In addition to the process parameters measured during the extrusion processes of Examples 2–13, the following obser-

TABLE 1

| | PEO Compositions | | | | | | |
|---|---|---|---|---|---|---|---|
| | PEO-Latex Base Resin (25 lb/hr feed rate) | | | | | Reactive Additives | |
| Example # | PEO wt % | Latex wt % | Plasticizer wt % | Antioxidant wt % | Process Stabilizers wt % | HEMA Rate (lb/hr) | Initiator Rate (lb/hr) |
| 2 | 71.0% Polyox ® 205 | 23.5% SB1168 | 5.0% Tween ® 20 | 0.5% Irganox ®1076 | | 0 | 0 |
| 3 | 71.0% Polyox ® 205 | 23.5% SB1168 | 5.0% Tween ® 20 | 0.5% Irganox ®1076 | | 0.38 | 0.038 |
| 4 | 71.0% Polyox ® 205 | 23.5% SB1168 | 5.0% Tween ® 20 | 0.5% Irganox ®1076 | | 0.75 | 0.075 |
| 5 | 71.0% Polyox ®N-750 | 23.5% SB1168 | 5.0% Tween ® 20 | 0.5% Irganox ®1076 | | 0 | 0 |
| 6 | 71.0% Polyox ®N-750 | 23.5% SB1168 | 5.0% Tween ® 20 | 0.5% Irganox ®1076 | | 0.38 | 0.038 |
| 7 | 71.0% Polyox ®N-750 | 23.5% SB1168 | 5.0% Tween ® 20 | 0.5% Irganox ®1076 | | 0.75 | 0.075 |
| 8 | 71.0% Polyox ®N-750 | 23.5% SB1168 | 5.0% Tween ® 20 | 0.15% Irganox ® 5057 0.10% Irganox ® 1135 | 0.25% Irgafos ® 168 | 0 | 0 |
| 9 | 71.0% Polyox ®N-750 | 23.5% SB1168 | 5.0% Tween ® 20 | 0.15% Irganox ® 5057 0.10% Irganox ® 1135 | 0.25% Irgafos ® 168 | 0.38 | 0.038 |
| 10 | 71.0% Polyox ®N-750 | 23.5% SB1168 | 5.0% Tween ® 20 | 0.15% Irganox ® 5057 0.10% Irganox ®1135 | 0.25% Irgafos ® 168 | 0.75 | 0.075 |
| 11 | 71.0% Polyox ®N-750 | 23.5% Hycar ®1581 | 5.0% Tween ® 20 | 0.5% Irganox ®1076 | | 0 | 0 |
| 12 | 71.0% Polyox ®N-750 | 23.5% Hycar ®1581 | 5.0% Tween ® 20 | 0.5% Irganox ®1076 | | 0.38 | 0.038 |
| 13 | 71.0% Polyox ®N-750 | 23.5% Hycar ®1581 | 5.0% Tween ® 20 | 0.5% Irganox ®1076 | | 0.75 | 0.075 | vations were made. Melt fracture, die build-up, excessive vapor release, and strands having a relatively rough texture were observed during the extrusion of each of the resins in Examples 2, 5, 8 and 11. Melt pressures for Examples varied from 450 psi to 730 psi. In contrast, melt pressures for the grafted PEO compositions varied from 200–470 psi. Further, the grafted PEO compositions formed by reactive extrusion produced smooth extruded strands, without die fracture or excessive vapor release. The melt processability of the grafted PEO compositions was much improved compared to the unmodified PEO compositions of Examples 2, 5, 8 and 11.

The resin pellets obtained in Examples 2–13 were converted into films on the Haake extruder described in Example 1. The extruder was fitted with a 4 inch film die, which was set at a temperature of 170° C. The screw speed varied from about 15 to 50 rpm to achieve desired film thicknesses. Film samples were collected for each Example and evaluated for tensile properties. A summary of results are given in Table 3 below.

Example 14

Method of Producing a Film From a Grafted PEO/ Modifier Composition

A grafted PEO/latex composition was prepared as in Example 12, except that a process stabilizer, 0.25 wt. % IRGAFOS® 168, and two antioxidants, 0.15 wt. % IRGANOX® 5057 and 0.1 wt. % IRGANOX® 1135 (all of which are available from Ciba Specialty Chemicals Corporation, Tarrytown, N.Y.), were used in place of antioxidant IRGANOX® 1076. The PEO composition was fed into the extruder at the extruder feed throat at a feed rate of 15 lb/hr. The screw speed of the extruder was 300 rpm.

A polar monomer, HEMA, was added to the molten PEO/latex composition through an injection orifice on barrel 5 at a feed rate of 0.23 lb/hr. The initiator, LUPERSOL® 101, was added to the molten polymer composition through an injection orifice on barrel 6 at a feed rate of 0.02 lb/hr. Both chemicals were injected via pressurized nozzle injectors.

The extruded melt strands were cooled in air using a fan-cooled conveyor belt. The solidified strands were then pelletized on a Conair pelletizer.

Then, the pellets were converted into films at Huntsman Packaging in Chippewa Falls, Wis. The films were converted by a flat-cast process at approximately 100 lb/hr. The film thickness was 0.50 mil.

Example 15

Method of Producing a Film From a Grafted PEO/ Modifier Composition

A film was formed using the grafted PEO/latex composition and procedure as in Example 14. The resulting film thickness was 0.80 mil.

Comparative Example 16

Method of Producing a Film From a Grafted PEO Composition

A film comprising HEMA grafted PEO was prepared for comparison purposes. The film composition was POLYOX® WSR-205 reactively extruded with 1.5 wt % HEMA and 0.15 wt % LUPERSOL® 101 initiator. The PEO was compounded on a ZSK-30 extruder. The PEO was fed into the extruder at the extruder feed throat at a feed rate of 20 lb/hr. The HEMA and initiator were fed into the extruder at the extruder feed throat at feed rates of 0.3 lb/hr and 0.003 lb/hr respectively. The screw speed of the extruder was 300 rpm.

The extruded melt strands were cooled in air using a fan-cooled conveyor belt. The solidified strands were then pelletized on a Conair pelletizer.

Then, the pellets were converted into films at Huntsman Packaging in Chippewa Falls, Wis. The films were converted by a flat-cast process at approximately 100 lb/hr. The film thickness was 0.75 mil.

The properties of the resulting film sample were representative of films cast from grafted PEO, which lack a modifier as a component. Films made from different grades of PEO are expected to behave in a similar fashion.

Comparative Example 17

Method of Producing a Film From an Unmodified PEO Composition

A film comprising an unmodified PEO was prepared for comparison purposes. The film composition was unmodified Polyox® WSR N-80 powder, extruded on a Haake extruder fitted with a 4 inch film die. WSR N-80 was used because it was the only grade of PEO that was able to be cast into film without modification. The PEO resin was fed into the twin extruder at the extruder feed throat at a feed rate of 20 lb/hr. The screw speed of the extruder was 300 rpm.

The extruded melt strands were cooled in air using a fan-cooled conveyor belt. The solidified strands were then pelletized on a Conair pelletizer.

Then, the pellets were converted into films at Huntsman Packaging in Chippewa Falls, Wis. The films were converted by a flat-cast process at approximately 100 lb/hr. However, due to the low melt strength of the unmodified PEO, the unmodified WSR N-80 film cast had a minimum thickness of at least 3.5 mil.

Examples 2–17

Summary of Film Properties of Films Formed From PEO Compositions

A summary of tensile properties are given below in Table 3 for the films produced from the PEO-containing compositions of Examples 2–17.

The tensile properties of the resulting films were assessed according to ASTM Test Method D 638-91 on a Sintech 1/D tensile tester. The gauge length was set at 18 mm, and the crosshead speed was 5 in/min. Table 3 shows the machine direction tensile properties of films prepared in Examples 2–17.

TABLE 3

Tensile Properties of Films Produced From PEO-Containing Compositions of Examples 2–17

| Example # | Film Thickness (mil) | Break Stress (Mpa) | % Strain at Break | Modulus (Mpa) | Energy to Break (j/cm³) |
|---|---|---|---|---|---|
| 2 | 1.20 | 6.8 | 200.9 | 112.8 | 14.4 |
| 3 | 1.06 | 7.0 | 322.1 | 108.7 | 22.5 |
| 4 | 1.00 | 7.9 | 389.2 | 106.6 | 28.5 |

TABLE 3-continued

Tensile Properties of Films Produced From PEO-Containing Compositions of Examples 2–17

| Example # | Film Thickness (mil) | Break Stress (Mpa) | % Strain at Break | Modulus (Mpa) | Energy to Break (j/cm³) |
|---|---|---|---|---|---|
| 5  | 1.00 | 6.4  | 357.8 | 112.5 | 27.0  |
| 6  | 1.48 | 7.4  | 367.9 | 127.4 | 26.8  |
| 7  | 1.08 | 7.4  | 440.5 | 102.7 | 32.4  |
| 8  | 1.38 | 7.2  | 459.3 | 93.1  | 35.0  |
| 9  | 1.11 | 9.1  | 727.4 | 97.0  | 60.7  |
| 10 | 1.06 | 9.1  | 727.4 | 97.0  | 60.7  |
| 11 | 0.70 | 7.8  | 765.6 | 51.4  | 50.1  |
| 12 | 0.72 | 9.4  | 872.2 | 78.7  | 70.5  |
| 13 | 1.10 | 11.6 | 908.4 | 104.9 | 116.4 |
| 14 | 0.50 | 18.2 | 840.0 | 120.4 | 122.0 |
| 15 | 0.80 | 12.1 | 745.7 | 121.4 | 79.0  |
| 16 | 0.75 | 51.6 | 865.5 | 279.7 | 255.2 |
| 17 | 3.5  | 8.1  | 201.1 | 148.8 | 16.7  |

Several trends were noted as the grafting level was increased. For each sample set (i.e., each group of Examples with the same base resin) as the level of HEMA increased, the break stress of the resulting film increased. Tensile energy to break and percent strain at break also increased as the grafting level increased. The only property tested, which did not exhibit a clear trend, was the modulus. For Examples 2–10, the modulus changed very little with grafting. However, in Examples 11–13, there was a clear increase in the film modulus as the HEMA level was raised. Overall, the films containing grafted PEO/latex had improved ductility and decreased brittleness compared to films containing only grafted PEO. The grafted PEO/latex films also had improved strength and elongation compared to unmodified PEO films.

Examples 2–17

Summary of Tear Resistance Properties of Films Formed From PEO Compositions

A summary of tear resistance properties are given below in Table 4 for the films produced from the PEO-containing compositions of Examples 14–17.

The tear resistance of films produced in Examples 14–17 was assessed according to ASTM Test Method D 1938-94 on a Sintech 1/D tensile tester. The initial grip separation was 2 inches, and the crosshead speed was 10 in/min. A single-tear type sample in the form of a strip having a length of 3 inches, a width of 1 inch, and a longitudinal slit having a length of 2 inches was used. The working area of the sample was 1 in²; this number multiplied by the film thickness gives the working volume of the sample. The purpose of the tear resistance test was to determine the force necessary to propagate a tear in the film by a single tear method.

The following data was recorded for each film tested:

Maximum Load: maximum force experienced by the film sample, normalized to sample thickness and width;

Total Energy: area under the load vs. extension curve, normalized to sample volume;

Energy to Peak Load: area under the load vs. extension curve from start of test to the point at which maximum load occurred, normalized to sample volume; and Failure by Tear: if yes, the film sample tore in the direction of the slit, and if no, a tensile failure occurred before tearing occurred.

The machine direction tear resistance data of films produced in Examples 14–17 is given below in Table 4.

TABLE 4

Tear Resistance Properties of Films Produced From PEO-Containing Compositions of Examples 14–17

| Example # | Maximum Load (g/mm²) | Total Energy (J/cm³) | Energy to Peak Load (J/cm³) | Failure by Tear |
|---|---|---|---|---|
| 14 | 46.1 | 42.3 | 33.2 | No  |
| 15 | 46.5 | 57.6 | 52.3 | No  |
| 16 | 43.6 | 6.1  | 4.5  | Yes |
| 17 | 2.9  | 0.4  | 0.2  | Yes |

Examples 14 and 15, which contained grafted PEO/latex, had much higher tear resistance than Examples 16 and 17, which contained grafted PEO and unmodified PEO, respectively. The total energy for the Examples containing latex ranged from 42–58 J/cm³, while the grafted PEO example was only 6 J/cm³, almost an entire order of magnitude lower. The unmodified PEO film had virtually no tear resistance; its maximum load was less than 3 g/mm² and its total energy was 0.4 J/cm³. It was also observed that both the grafted PEO film and the unmodified PEO film tore in the direction of the applied force. The grafted PEO/latex films experienced tensile failure before tearing. The latex dispersion provided a mechanism for slit blunting and stress redistribution at the slit tip to allow tensile failure. The dispersion of the latex is shown in the following phase morphology section.

Example 18

Phase Morphology of Films Formed From PEO Compositions

Figure 2:
FIG. 2 is an image taken with a scanning electron microscope, which shows the phase morphology of a film produced from a 3.6 wt % HEMA grafted PEO/HYCAR® 1581 elastomer composition.

The phase morphology of grafted PEO/latex films was studied by scanning electron microscopy (SEM). FIGS. 1 and 2 show cross-sectional views of films produced in Examples 3 and 12, respectively. Both films contained the same amount of plasticizer and antioxidants, and were grafted with the same amount of HEMA. Example 3 contains SB 1168 latex, while Example 12 contains Hycar® 1581 latex. The figures show that a finer particulate dispersion was obtained with the Hycar® 1581 latex than with the SB1168 latex. This finer dispersion led to improved strength, toughness and ductility in the resulting grafted PEO/latex films.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A solid melt-extruded blend comprising:
   a water-soluble or water-dispersible polymer;
   modifier particles dispersed throughout the water-soluble or water-dispersible polymer; and
   one or more monomers grafted onto at least one of the water-soluble or water-dispersible polymer and the modifier particles;
   wherein the modifier particles are elastomer particles.

2. The solid melt-extruded blend of claim 1, wherein the water-soluble or water-dispersible polymer is selected from polyethylene oxide, hydroxypropyl cellulose, polyvinyl alcohol, polyethyloxazoline, polyvinyl pyrrolidone, polyvinyl pyridine, gelatinized starch, nylon copolymers, polyacrylic acid, polyesters and mixtures thereof.

3. The solid melt-extruded blend of claim 2, wherein the water-soluble or water-dispersible polymer comprises polyethylene oxide.

4. The solid melt-extruded blend of claim 1, wherein the modifier particles are selected from organic particles, inorganic particles, and a mixture thereof.

5. The solid melt-extruded blend of claim 4, wherein the organic elastomeric particles are selected from a styrene butadiene polymer, a carboxylated styrene butadiene polymer, an acrylic polymer, a styrene acrylic polymer, a polyvinyl acetate, an acrylonitrile-butadiene-styrene polymer, an acrylonitrile polymer, an acrylonitrile-butadiene polymer, a carboxylated acrylonitrile-butadiene polymer, and a combination thereof.

6. The solid melt-extruded blend of claim 5, wherein the organic particles are selected from a styrene butadiene polymer, a carboxylated acrylonitrile-butadiene-styrene polymer, and a combination thereof.

7. The solid melt-extruded blend of claim 4, wherein the inorganic particles comprise silica particles.

8. The solid melt-extruded blend of claim 1, wherein the one or more monomers is selected from acrylates; methacrylates; 2-hydroxyethyl methacrylate (HEMA); poly(ethylene glycol) methacrylates (PEG-MA); poly(ethylene glycol) ethyl ether methacrylate; poly(ethylene glycol) acrylates; poly(ethylene glycol) ethyl ether acrylate; poly(ethylene glycol) methacrylates with terminal hydroxyl groups; acrylic acid; maleic anhydride; itaconic acid; sodium acrylate; 3-hydroxypropyl methacrylate; acrylamide; glycidyl methacrylate; 2-bromoethyl acrylate; carboxyethyl acrylate; methacrylic acid; 2-chloroacrylonitrile; 4-chlorophenyl acrylate; 2-cyanoethyl acrylate; glycidyl acrylate; 4-nitrophenyl acrylate; pentabromophenyl acrylate; poly(propylene glycol) methacrylate; poly(propylene glycol) acrylate; 2-propene-1-sulfonic acid and its sodium salt; 2-sulfoethyl methacrylate; 3-sulfopropyl methacrylate; 3-sulfopropyl acrylate; and a mixture thereof.

9. The melt-extruded blend of claim 8, wherein the one or more monomers is selected from poly(ethylene glycol) ethyl ether methacrylate; poly(ethylene glycol) ethyl ether acrylate; 2-hydroxyethyl methacrylate (HEMA); and poly(ethylene glycol) methacrylate (PEG-MA).

10. The solid melt-extruded blend of claim 1, wherein the modifier particles comprise from 3 wt % to 30 wt % based on the weight of the water-soluble or water-dispersible polymer.

11. The solid melt-extruded blend of claim 1, wherein the modifier particles have an average particle size of from 10 nanometers to 20 microns.

12. The solid melt-extruded blend of claim 1, wherein the polymer resin comprise from 10 wt % to 95 wt % based on the total weight of the blend.

13. The solid melt-extruded blend of claim 1, wherein the polymer resin comprise from 45 wt % to 90 wt % based on the total weight of the blend.

14. The solid melt-extruded blend of claim 1, wherein the polymer resin comprise from 50 wt % to 85 wt % based on the total weight of the blend.

15. The solid melt-extruded blend of claim 1, further comprising bound water.

16. The solid melt-extruded blend of claim 1, wherein the melt-extruded blend is a film or fiber.

17. The solid melt-extruded blend of claim 1, wherein the melt-extruded blend is a film having a thickness of from about 1 mil to about 4 mil.

18. The solid melt-extruded blend of claim 1, wherein the melt-extruded blend is a film having an elongation-at-break in the machine direction of from about 150% to about 1000%, and an elongation-at-break in the transverse direction of from about 100% to about 1000%.

19. The solid melt-extruded blend of claim 1, wherein the melt-extruded blend is an unstretched film having a water vapor transmission rate of from about 800 $g/m^2/24$ hr/mil to about 7,000 $g/m^2/24$ hr/mil.

20. A solid melt-extruded blend comprising:
   a water-soluble or water-dispersible polymer;
   modifier particles dispersed throughout the water-soluble or water-dispersible polymer;
   one or more monomers grafted onto at least one of the water-soluble or water-dispersible polymer and the modifier particles; and
   bound water hydrogen bonded to portions of the water-soluble or water-dispersible polymer;
   wherein the modifier particles are elastomer particles.

21. The solid melt-extruded blend of claim 20, wherein the water-soluble or water-dispersible polymer is selected from polyethylene oxide; the modifier particles comprise a styrene butadiene polymer, a carboxylated acrylonitrile-butadiene-styrene polymer, or a combination thereof; and the one or more monomers comprise poly(ethylene glycol) ethyl ether methacrylate, poly(ethylene glycol) ethyl ether acrylate, 2-hydroxyethyl methacrylate (HEMA), poly(ethylene glycol) methacrylate (PEG-MA), and a mixture thereof.

22. The solid melt-extruded blend of claim 20, wherein the melt-extruded blend is a film having an elongation-at-break in the machine direction of from 150% to 1000%; an elongation-at-break in the transverse direction of from 100% to 1000%; and a water vapor transmission rate of from 800 $g/m^2/24$ hr/mil to 7,000 $g/m^2/24$ hr/mil in an unstretched condition.

23. A solid melt-extruded blend comprising:
   polyethylene oxide;
   modifier particles dispersed throughout the polyethylene oxide;
   one or more monomers grafted onto at least one of the polyethylene oxide and the modifier particles; and
   bound water hydrogen bonded to oxygen atoms of the polyethylene oxide;
   wherein the modifier particles are selected from a styrene butadiene polymer, a carboxylated acrylonitrile-butadiene-styrene polymer, and a combination thereof;
   wherein the melt-extruded blend is a film having an elongation-at-break in the machine direction of from 150% to 1000%, an elongation-at-break in the transverse direction of from 100% to 1000%; and a water vapor transmission rate of from $g/m^2/24$ hr/mil to 7000 $g/m^2/24$ hr/mil when in an unstreached condition.

* * * * *